United States Patent [19]

Duyvesteyn et al.

[11] Patent Number: 4,552,629

[45] Date of Patent: Nov. 12, 1985

[54] ELECTROGALVANIZING UTILIZING PRIMARY AND SECONDARY ZINC SOURCES

[75] Inventors: Willem P. C. Duyvesteyn, Benthuisen, Netherlands; Robert F. Hogsett, Arvada, Colo.

[73] Assignee: Amax, Inc., Greenwich, Conn.

[21] Appl. No.: 696,985

[22] Filed: Jan. 31, 1985

[51] Int. Cl.[4] .................................................. C25C 3/22
[52] U.S. Cl. .................................. 204/55 R; 204/119; 75/101 BE; 75/110; 75/120; 423/95; 423/100; 423/128; 423/145; 423/166
[58] Field of Search ........................... 204/55 R, 119; 75/101 BE, 110, 120; 423/95, 166, 128, 145, 100

[56] References Cited

U.S. PATENT DOCUMENTS

| | | | |
|---|---|---|---|
| 4,362,607 | 12/1982 | Ritcey et al. | 24/118 |
| 4,421,616 | 12/1983 | Bjune et al. | 423/100 |
| 4,465,569 | 8/1984 | Bjune et al. | 423/100 |

Primary Examiner—R. L. Andrews
Attorney, Agent, or Firm—Michael A. Ciomek; Eugene J. Kalil

[57] ABSTRACT

A hydrometallurgical process is provided to electrogalvanize steel, utilizing primary and secondary zinc sources. The process consists of leaching the feed in a mildly acidic solution. The zinc is selectively recovered from the leach liquor in a solvent extraction system and thereafter stripped from the solvent using a stronger acidic solution to provide a strip solution which is fed to an electrogalvanizing bath for electrogalvanizing steel products, e.g., sheet steel, using insoluble anodes. Acidic solutions and organic solvent are recycled in the process.

10 Claims, 1 Drawing Figure

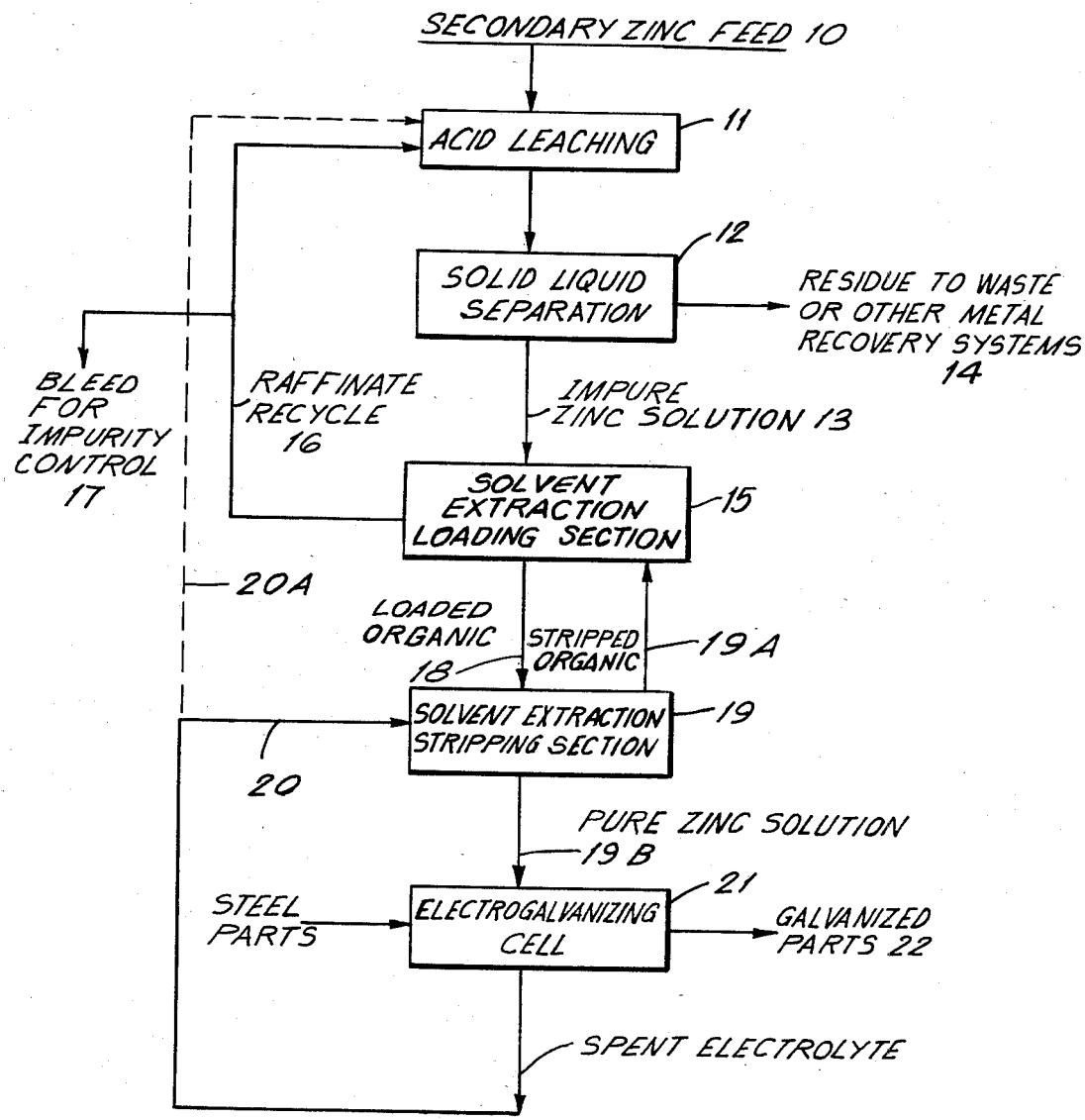

ELECTROGALVANIZING UTILIZING PRIMARY AND SECONDARY ZINC SOURCES

This invention relates to a process for producing electrogalvanized ferrous metal articles using zinc obtained hydrometallurgically from primary and secondary zinc sources, such as oxidic zinc ores, zinc calcine, steel plant dusts, zinc dross and/or metallics, zinc residues and the like.

BACKGROUND OF THE INVENTION

Secondary zinc sources are an economic source of zinc compared to primary zinc. Such secondary sources include steel plant dusts, Zinc dross, zinc residues and other sources of secondary zinc. It would be desirable to use zinc-containing steel plant dusts in that the disposal of steel plant dusts is quite expensive. Such dusts have been classified by the EPA as hazardous because of the cadmium and lead content and, therefore, require special disposal sites.

A very common use of zinc is in providing a protective coating to steel. Close to 50% of the annual consumption of zinc is in the production of zinc-coated steel products. Zinc provides excellent resistance to corrosion in all types of air atmospheres, which property is one of the most broadly exploited. Traditionally, the most common process is hot dip galvanizing.

However in recent years, electrogalvanizing has become more popular. In this process, zinc is electrolytically deposited from an aqueous solution on the metal part to be coated.

Electrogalvanizing offers several advantages. Some of these are:

1. The electrodeposited zinc surface has a smoother, more uniform finish and is more suitable for further deposition of alloys such as zinc-nickel or zinc-iron alloys. The electrodeposited coating also provides a surface that has improved paintability compared to hot dip galvanized steel.

2. Savings can be realized by reducing the thickness of the coating and by plating only one side of the strip or sheet. Such sheets and strips find wide applications in automobiles and household appliances.

3. There are no adverse metallurgical effects on the base material, as is the case with thermal effects due to using molten metals.

4. The technique is particularly suited to the protection of small components, pressings and threaded fasteners which cannot be hot dip galvanized due to distortion or clogging of threads.

In the past, it has not been uncommon to use zinc cyanide baths for plating. However, with increasingly stringent environmental regulations, the emphasis is shifting towards zinc sulfate baths. Two options are available to supply the zinc to the bath. In the first option, zinc is supplied as a consumable anode. In the second option, a non-consumable anode such as coated titanium or lead is used as the anode. Zinc is added to the electrolyte in the form of pure zinc by leaching pure zinc metal, oxide or carbonate in spent electrolyte.

The technology of using insoluble electrodes is well known. Reference is made to a paper entitled "High-Speed Electrogalvanizing Line With Insoluble Anodes At Kimitsu Works Of Nippon Steel Corporation" by M. Morimoto et al., *Proceedings Of 2nd Continuous Plating Seminar*, American Electroplating Society, Winter Park, Fla., 1977, pp. 5-8. Carbon, lead alloy, metals of the platinum group and the like are mentioned as usable materials as insoluble anodes. This paper is incorporated herein by reference.

SHORTCOMINGS OF THE PRIOR ART

The use of consumable zinc anodes has its disadvantages in that it requires the casting of molten zinc to produce electrodes of the desired shape. Another method employed by the Japanese, supra, utilizes zinc dross as a source of zinc to replenish the zinc in the spent electrolyte. However, none of the aforementioned processes can accept impure zinc sources, since impurities must be avoided in the zinc electrolyte. For example, (1) at more than 100 ppm lead, the zinc coating tends to be incompletely bonded to the steel surface, and (2) with more than about 10 ppm copper in the Zinc deposit, the formability of sheet steel will be reduced significantly.

A process has been proposed for the production of electrolytic zinc or high purity zinc salts from secondary raw materials, such as smelting slags, galvanizing acids, alkaline zinc dross and impure zinc oxides or hydroxides. Such a process is disclosed in U.S. Pat. No. 4,401,531 which was issued to D. M. S. Lorenzo et al. on Aug. 30, 1983.

The process comprises leaching the secondary raw material in a slightly acid aqueous solution at a controlled pH wherein a leach liquor is obtained enriched in zinc and a solid residue obtained which is discarded after washing. The zinc is recovered from the leach liquor by solvent extraction with an organic solution selective to zinc, the organic solution containing an organic acid reagent, such as di-(2 ethylhexyl) phosphoric acid (D2EHPA) or Di-2-ethyl-phosphonic acid (HEH/EHP) which selectively removes the zinc from the aqueous solution.

The zinc is stripped from the organic solvent using a strong acid solution of zinc sulfate in which the zinc in the solvent is exchanged for hydrogen in the acid solution, whereby an aqueous solution of fairly high zinc concentration is obtained. The stripped organic solvent is used over again by recycling it to the solvent extraction stage.

The purified aqueous solution of zinc is then used to produce electrolytic zinc by electrowinning or the solution is sent to a crystallization plant for the production of pure zinc sulfate. The spent electrolyte from the electrowinning stage and/or the mother liquors from the crystallization plant are then recycled after sulfuric acid make-up to the stripping stage for stripping zinc from the organic.

This process is cost intensive with respect to the final product produced. In the case of the electrolytic zinc which is produced as an end product, it must be melted if it is to be used for hot dip galvanizing or for producing castings. Likewise, it is cost intensive to produce pure crystals of zinc sulfate.

It would be desirable to provide a process wherein the zinc in the purified aqueous solution can be used directly in the production of a final product, such as an electrogalvanized product. This would be advantageous since it would eliminate the cost of electrowinning twice: first at the zinc electrowinning plant and second at the electroplating plant.

As is well known, there are numerous sources of secondary zinc. If such sources can be utilized for electrogalvanizing, two objectives can be achieved: (1) the electrogalvanizing will become more attractive economically with a cheaper source of zinc; and (2) some of the disposal problems associated with steel plant dusts and other secondary sources of zinc would be solved.

OBJECTS OF THE INVENTION

It is thus an object of the invention to provide a hydrometallurgical process for recovering zinc from finely divided secondary zinc sources, such as steel plant dusts, zinc plant leach residues, zinc dross and the like, that contain substantial amounts of iron, copper and other impurities (e.g., aluminum, lead, calcium, cadmium, etc.).

Another object is to recover zinc in the form of a purified solution for particular use in electrogalvanizing applications using insoluble anodes.

A further object is to provide a hydrometallurgical process which employs a novel combination of operational steps which utilize internal recycle of process solutions, such as spent electrolyte and stripped organic solvent obtained during solvent extraction to maintain the cost of operation as low as possible.

These and other objects will more clearly appear when taken into conjunction with the following disclosure, the appended claims and the accompanying drawing which is a flow sheet illustrative of one embodiment of the invention.

SUMMARY OF THE INVENTION

One embodiment of the invention resides in a process for producing electrogalvanized articles from an acid-leachable zinciferous material, for example, primary and secondary zinc sources, such as zinc oxide ores, calcines, steel plant dusts, zinc drosses and zinc skimmings, among other zinciferous materials containing iron, lead and calcium compounds, and at least one of the elements cadmium and aluminum as compounds, including other impurities, such as chloride and fluoride salts. The zinc content may range from as low as about 5% to as high as about 80% by weight, for example, about 10 to 40%.

The steps of the process include leaching the zinciferous material with the acid solution at an elevated temperature below the boiling point of the solution which is maintained at a pH in the range from about 2 to 3.5 to inhibit dissolution of iron contained in the zinciferous material; subjecting the leach solution to solid-liquid separation to remove the lead and calcium sulfate precipitate formed and other solids and provide a filtrate containing zinc, some iron and at least one of aluminum and cadmium and impurities and oxidizing the filtrate to raise the iron to its highest valence and adjusting the pH to a level selective to the precipitation of the iron and aluminum present.

This is followed by separating the precipitate from the filtrate containing zinc, cadmium and impurities; separating zinc from the filtrate at an organic solvent extraction stage by using an organic solvent which contains an extractant selective to the removal of zinc while forming an aqueous raffinate containing impurities which is recycled following bleeding to the leaching stage; stripping the zinc from the solvent using a solution containing sulfuric acid to provide a purified zinc electrogalvanizing solution and provide a stripped organic; recycling the stripped organic to the organic solvent extraction stage; contacting the electrogalvanizing solution with a ferrous metal shape to be plated, the ferrous metal shape being electrically coupled as a cathode relative to an insoluble anode immersed in the solution; electrogalvanizing the ferrous metal shape by passing a current from the insoluble anode to the ferrous metal shape coupled as the cathode and thereby produce a spent electrolyte; and then recycling the spent electrogalvanizing solution to the stripping stage or optionally to the leaching stage to control impurity build-up.

BRIEF DESCRIPTION OF THE DRAWING

The essence of the invention is illustrated in the accompanying drawing. A typical example of steel plant dust is one containing by weight about 28.8% zinc oxide, 6.1% lead oxide, 37% iron oxide and the balance essentially aluminum oxide (5–8%), silicon oxide (8–12%), magnesium oxide (3–5%) and calcium oxide (3–6%). Another example is one containing 39.64% zinc oxide, 5.72% lead oxide and 36.74% iron oxide and the balance essentially other metal oxides mentioned hereinabove. Generally speaking, the zinc in steel plant dust may range from about 10% to 40% by weight.

DETAILED DESCRIPTION OF THE DRAWING

Referring to the flow sheet, secondary zinc feed 10 is fed to the acid leaching stage 11 comprising a solution of $H_2SO_4$ maintained at a pH ranging from about 2 to 3.5.

Following leaching, the solid-liquid mixture is passed to solid-liquid separation stage 12 to provide an impure zinc solution 13 and residue 14 which is sent to waste or to other metal recovery systems.

The impure zinc solution is then sent to the solvent extraction stage 15, the solvent being an organic which is selective to the extraction of zinc. The aqueous solution 16 remaining as the raffinate and which contains the impurities is recycled to acid leach stage 11, with a bleed 17 provided for impurity control. The loaded organic 18 is then sent to solvent extraction stripping stage 19 using a strong acid solution of pH below 1.5, for example, down to zero, which may comprise recycle spent electrogalvanizing solution 20 from electrogalvanizing cell 21.

The stripped organic phase 19A is recycled to the solvent extraction stage 15 for further use as a solvent. Any impurities in the solvent may be removed by washing with a dilute acid solution.

The purified zinc solution 19B is fed to electrogalvanizing cell 21 in which ferrous metal parts are electrogalvanized to provide zinc coated products or parts 22. As stated previously, the spent electrolyte 20 is recycled to stripping stage 19 or optionally as recycle 20A to the acid leaching stage 11 as shown as make-up acid to control the pH from about 2 to 3.5, and also bleed impurities.

Thus, as will be apparent from the flow sheet, the leaching section is maintained at a relatively low acid concentration of pH in the range of about 2 to 3.5 or 2.5 to 3.5; whereas the solvent stripping and electrogalvanizing section is maintained at a relatively strong acid concentration of pH below 1.5 down to zero or a free acid concentration of about 40 to 100 gpl.

DETAILS OF THE INVENTION

The process is comprised of three major unit operations: (1) leaching, (2) purification, and (3) electrogalvanizing. The important technical considerations for these three operations are discussed as follows:

Leaching

The main objective of this operation is to dissolve as much zinc as possible without excessive dissolution of other metals present in the secondary feed. Another objective is to perform the dissolution with minimum amounts of reagents and energy. The two objectives are accomplished by performing the leaching in a mildly acid medium, say at a pH of about 2 to 3.5 or about 2.5 to 3.5. The main reaction is represented by the following:

$$ZnO + 2H^+ \rightarrow H_2O + Zn^{2+} \tag{1}$$

$$Zn + 2H^+ \rightarrow H_2 + Zn^{2+} \tag{2}$$

The main advantages of this system are:
1. Almost complete rejection of lead and calcium is obtained as insoluble sulfates.
2. Better settling and filtering characteristics are obtained with respect to the residue.
3. The capability of the system to process chloride-containing secondary zinc materials is enhanced.

The leaching can be performed on as-received material or after grinding, if necessary. The pulp density can be adjusted in a wide range of from about 2 percent to as high as about 40 percent, e.g., about 3 percent to 20 percent, depending upon the physical and chemical characteristics of the feed material. The aim is to obtain a leach liquor (including wash liquor) with about 10 to 30 grams per liter (gpl) zinc. The temperature may advantageously be maintained below the boiling point, e.g., 30° to 90° C. The residence time will depend upon the system geometry, quality of agitation, mode of operation (batch v. continuous), temperature, acid concentration or pH, and the particle size of the feed. Generally speaking, less than 2 or 1 hour will be adequate to dissolve most of the zinc while avoiding dissolution of substantial amounts of iron.

Purification

Depending upon the chemical characteristics of the feed material and process conditions used in the leaching step, the leach liquor may contain various metallic impurities such as copper, cadmium, nickel, cobalt, manganese, iron, calcium, magnesium, etc. The steady state concentration of these impurities will be generally from a few ppm level to as high as about 1 to 5 gpl, depending upon the size of the bleed stream. If no SX (solvent extraction) is included in the processing scheme, the solubility of lead (Pb) in a mixed chloride/sulfate environment with Cl⁻ originating from zinc secondaries will increase significantly and Pb would therefore be deposited with zinc. This is detrimental to the quality of the deposit.

From such solutions, the zinc can be selectively extracted. A preferred extractant is Di-(2-ethylhexyl) phosphoric acid, commonly known as D2EHPA. Generally, this eXtractant is used for zinc sulfate solutions, as described in U.S. Pat. No. 4,401,531. However, the extractant can selectively extract zinc from chloride solutions also as described in U.S. Pat. No. 4,288,304. Another possible extractant is tributyl phosphate, commonly known as TBP.

The process conditions in the solvent extraction circuit (number of stages, aqueous-to-organic ratio, concentration of the extractant in the organic phase, etc.) can be optimized, based on the specific leach liquor composition, to extract zinc selectively and completely. In a very simplistic manner, the loading reaction can be represented by:

$$Zn^{2+} + 2R.H \rightarrow R_2Zn + 2H^+ \tag{3}$$

where R is the active group in the extractant. The H⁺ ions generated during the loading process are recycled as raffinate to the leaching step, where they are used to dissolve more zinc according to Reaction 1 or 2.

The loaded organic, after a scrubbing stage if necessary, is advanced to the stripping section. An acid solution of pH below 1.5, the spent electrolyte recycled from the electroplating step, is used to strip zinc and reconvert the organic to its acidic form, according to the simplified reaction:

$$R_2Zn + 2H^+ \rightarrow 2R.H + Zn^{2+} \tag{4}$$

The organic is recycled to the loading step to extract more zinc according to Reaction 3. The acid solution used in stripping may contain about 40 to 100 gpl of free acid.

Depending upon the conditions used in the stripping section, particularly the aqueous-to-organic ratio, the strip solution may contain 50 to 100 gpl zinc with hardly any impurities in it. The solution is advanced to the electroplating step.

Electrogalvanizing

As mentioned earlier, the process contemplates electrogalvanizing with insoluble anodes. While the detailed design of the cell can vary, the basic reactions remain the same as presented below:

At insoluble anode (platinum-coated titanium or lead alloy)

$$H_2O \rightarrow 2H^+ + \tfrac{1}{2}O_2 + 2e \tag{5}$$

At cathode (steel part to be electrogalvanized)

$$Zn^{2+} + 2e \rightarrow Zn° \tag{6}$$

The H⁺ ions, generated by Reaction 5, are recycled as spent electrolyte to the stripping section, where they strip more zinc according to Reaction 4.

The solution obtained by stripping, 50 to 100 g/L zinc at a pH of 1 or more, is suitable for electrogalvanizing.

As illustrative of the invention, the following example is given:

EXAMPLE

Steel plant dust having the following composition by weight is leached in accordance with the invention: about 29.68% zinc oxide, 2.79% lead oxide, about 42.61% iron oxide, about 0.76% aluminum oxide, about 3.05% silicon dioxide, about 0.69% magnesium oxide, about 6.03% calcium oxide and 380 ppm cadmium.

About 44 grams of the steel plant dust is mixed with one liter of an acid solution comprised of a mixture of HCl and H₂SO₄, the pulp density of the mixture being about 5% by weight.

The solution contains 15 gpl HCl+H₂SO₄ (5 gpl chloride ions and 35 gpl sulfate ions), 1.5 gpl Mn, 3.5 gpl Mg, 2.5 gpl Na, 2 gpl K, 0.5 gpl Ca and 130 ppm Cd.

By using a sulfuric acid hydrochloric acid mixture, the following objectives are achieved:

1. Zinc, cadmium, chloride and fluoride salts are substantially completely dissolved with complete rejection of lead and calcium.

2. Iron is partially dissolved as is aluminum.

3. Partial dissolution of aluminum is advantageous since it provides aluminum ions for the precipitation of fluoride ions as $AlF_3$ initially present in the steel plant dust.

4. The mixed lixiviant enables the use of a chloride containing oxidant in the iron oxidation/precipitation stage. This oxidant can easily be produced in situ electrolytically in the process by carrying out part of the zinc recovery process step in the chloride phase which produces Zn metal, free hydrochloric acid and chlorine gas which is useful as an oxidant within the system.

Generally speaking, the mixed acid employed in dissolving zinc and cadmium and precipitating the lead contains about 5-15 gpl chloride ions ($Cl^-$) and about 30-45 gpl sulfate ions ($SO_4^=$), the ratio of sulfate ions to chloride ions being approximately 3:1. Broadly speaking, the chloride ions may range from 0 to about 15 gpl and the sulfate ions from about 10 to 60 gpl.

The exothermic nature of the leaching reaction heats the leach solution to about 50° C. and the leaching is conducted for less than about 1 hour wherein substantially all of the acid-soluble metal values, including chloride and fluorides, are dissolved except for lead and calcium which report to the residue as sulfate together with any undissolved iron oxide, aluminum oxide, etc.

Following completion of the leaching, the slurry is subjected to liquid/solid separation, the solution or filtrate being subjected to oxidation to effect separation of dissolved iron and aluminum as a precipitate. This is achieved by oxidizing the solution to raise the oxidation voltage by bubbling chlorine gas therethrough, and also by slightly increasing the pH to about 3.5 to 4.5 by the addition of a base, e.g., lime, if necessary.

Following precipitation of iron and aluminum the precipitate is removed to provide a clean filtrate which is sent to solvent extraction 15. The filtrate is mixed with an organic solvent of kerosene containing by volume 20% of D2EHPA (a di-2-ethylhexyl phosphoric acid) and the zinc extracted from the aqueous solution using a series of solvent extraction stages (e.g., three) with the raffinate recycled to leaching following bleeding of some of the impurities.

The organic solvent loaded with zinc is then stripped in a series of stripping stages using a strong acid solution of pH about zero, such as spent electrolyte, which has been partially fortified with sulfuric acid to assure substantially complete stripping of zinc, the volume ratio of organic solvent to the acid solution being such as to provide a loaded strip solution containing about 50 to 100 gpl zinc suitable for electrogalvanizing, in this instance 75 gpl zinc.

A ferrous metal part is galvanized by supporting said part in the zinc electrolyte and zinc then electrodeposited thereon using an insoluble anode of platinum-coated titanium or a lead-silver alloy at a current density ranging from about 100-2,000 amps/sq. ft. for a time sufficient to provide a zinc coating of thickness in the neighborhood of about 0.0001 inch (about 0.1 to 1 oz. Zn/sq. ft.).

Summarizing the invention, the leaching solution may comprise about 0 to 15 gpl chloride ions and 10 to 60 gpl sulfate ions of acid concentration sufficient to maintain the pH of the solution in the range of about 2 to 3.5 or 2.5 to 3.5.

The organic solvent and extractants employed include those selected from the group consisting of kerosene, aromatic and aliphatic organic solvents, and the extractant is selected from the group consisting of di-(2-ethylhexyl) phosphoric acid (DE2EHPA), di-2-ethylphosphonic acid (HEH/EHP), di-(2,4,4-trimethylpentyl) phosphinic acid, and tributyl phosphate (TBP). The amount of extractant may range from about 5% to 40% by volume.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A process for producing electrogalvanized articles from primary and secondary zinciferous materials, selected from the group consisting of zinc oxide ores, calcines, steel plant dust, zinc dross and/or metallics, and zinc residues containing iron, lead and calcium compounds, and at least one of the elements cadmium and aluminum as compounds thereof, and chloride and fluoride salts which comprises, mixing a charge of said zinciferous material with an acid leach solution containing a mixture of chloride and sulfate ions,
the amount of sulfate ions as sulfuric acid being at least stoiciometrically sufficient to react with zinc to form a soluble sulfate thereof and with lead and calcium to form a sulfate precipitate thereof, leaching said oxidic zinciferous material with said solution at an elevated temperature below the boiling point of said solution maintained at a pH in the range of about 2 to 3.5 to inhibit dissolution of iron contained in said zinciferous material, subjecting said solution to solid-liquid separation to remove the lead and calcium sulfate precipitate and other solids and provide a filtrate containing zinc, some iron and at least one of aluminum and cadmium, oxidizing said filtrate and adjusting the pH thereof to a level selective to the precipitation of any iron and aluminum present, separating the precipitate from said filtrate containing zinc, cadmium and impurities, separating zinc from said filtrate at an organic solvent extraction stage by using an organic solvent selective to the removal of zinc, stripping the zinc from said solvent in a stripping stage using an acid solution containing sulfuric acid of pH below about 1.5 to provide a purified zinc solution for electrogalvanizing, recycling the stripped organic to said organic solvent extraction stage, contacting said electrogalvanizing solution with a ferrous metal part to be plated, wherein the ferrous metal part is employed as a cathode relative to an insoluble anode immersed in said solution, electrogalvanizing said ferrous metal part by passing a current from said insoluble anode to said ferrous metal part as the cathode and thereby produce spent electrogalvanizing solution, and recycling said spent electrogalvanizing solution to the stripping stage and/or the leaching stage.

2. The process of claim 1, wherein the amount of said zinciferous material mixed with the acid leach solution is sufficient to provide a pulp density of about 2% to 40% by weight.

3. The process of claim 1, wherein the acid solution comprises up to about 15 gpl chloride ions and about 10 to 60 gpl sulfate ions, the acid concentration being sufficient to maintain the pH of the solution in the range of about 2 to 3.5.

4. The process of claim 1, wherein the organic solvent is selected from the group consisting of kerosene, aromatic, and aliphatic solvents, and the extractant is selected from the group consisting of di-(2-ethylhexyl) phosphoric acid (DE2EHPA), di-2-ethyl-phosphonic acid (HEH/EHP), di-(2,4,4-trimethylpentyl) phosphinic acid, and tributyl phosphate (TBP).

5. The process of claim 4, wherein the amount of extractant in the organic solvent ranges by volume from about 5% to 40%.

6. The process of claim 1, wherein the zinciferous material contains aHout 5% to 80% by weight of zinc.

7. A process for producing electrogalvanized articles from primary and secondary zinciferous material, selected from the group consisting of zinc oxide ores, calcines, steel plant duct, zinc dross and/or metallics, and zinc residues containing iron, lead and calcium compounds, and at least one of the elements cadmium and aluminum as compounds thereof, and chloride and fluoride salts which comprises, mixing a charge of said zinciferous material containing about 10% to 40% by weight of zinc with an acid leach solution containing a mixture of chloride and sulfate ions at a pulp density by weight of about 2% to 40% solids, the amount of sulfate ions as sulfuric acid being at least stoichiometrically sufficient to react with zinc to form a soluble sulfate thereof and with lead and calcium to form a sulfate precipitate thereof, leaching said zinciferous material with said solution at an elevated temperature below the boiling point of said solution maintained at a pH in the range of about 2 to 3.5 to inhibit dissolution of iron contained in said zinciferous material, subjecting said solution to solid-liquid separation to remove the lead and calcium sulfate precipitate and other solids and provide a filtrate containing zinc, some iron and at least one of aluminum and cadmium, oxidizing said filtrate and adjusting the PH thereof to a level selective to the precipitation of any iron and aluminum present, separating the precipitate from said filtrate containing zinc, cadmium and impurities, separating zinc from said filtrate at an organic solvent extraction stage by using an organic solvent containing at least one extractant selected from the group consisting of di-(2-ethylhexyl) phosphoric acid (DE2EHPA), di-2-ethyl-phosphonic acid (HEH/EHP), di-(2,4,4-trimethylpentyl) phosphinic acid, and tributyl phosphate (TBP) selective to the removal of zinc, stripping the zinc from said solvent in a stripping stage using an acid solution containing sulfuric acid of pH below 1.5 to provide a purified zinc solution for electrogalvanizing, recycling the stripped organic to said organic solvent extraction stage, contacting said electrogalvanizing solution with a ferrous metal part to be plated, wherein the ferrous metal part is employed as a cathode relative to an insoluble anode immersed in said solution, electrogalvanizing said ferrous metal part by passing a current from said insoluble anode to said ferrous metal part as the cathode and thereby produce a spent electrogalvanizing solution, and recycling said spent electrogalvanizing solution to the stripping stage and/or the leaching stage.

8. The process of claim 7, wherein the acid solution comprises up to about 15 gpl chloride ions and about 10 to 60 gpl sulfate ions sufficient to maintain the pH of the solution in the range of about 2.5 to 3.5.

9. The process of claim 7, wherein the organic solvent is selected from the group consisting of kerosene, aromatic and aliphatic solvents.

10. The process of claim 9, wherein the amount of extractant in the organic solvent ranges by volume from about 5% to 40%.

* * * * *